MAGNETIC CORE BRANCHING SHIFT REGISTER ARRANGEMENT

Filed Dec. 17, 1964

4 Sheets-Sheet 1

INVENTOR
J. E. SCHWENKER
BY Lucian C. Canepa
ATTORNEY

MAGNETIC CORE BRANCHING SHIFT REGISTER ARRANGEMENT

Filed Dec. 17, 1964 4 Sheets-Sheet 2

Oct. 7, 1969 J. E. SCHWENKER 3,471,837

MAGNETIC CORE BRANCHING SHIFT REGISTER ARRANGEMENT

Filed Dec. 17, 1964 4 Sheets-Sheet 4

3,471,837
MAGNETIC CORE BRANCHING SHIFT REGISTER ARRANGEMENT

John E. Schwenker, Millington, N.J., assignor to Bell Telephone Laboratories, Incorporated, New York, N.Y., a corporation of New York Filed Dec. 17, 1964, Ser. No. 418,994
Int. Cl. G11b 5/00
U.S. Cl. 340—174 19 Claims

ABSTRACT OF THE DISCLOSURE

A branching balanced magnetic shift register is developed for propagating information signals through selected branches of the register. A linked set of $2^n$ balanced magnetic cores is included in branch point register stage for selectively routing information signals among $2^n-1$ branches via $2^n-1$ mutually orthogonal signal windings so that clock energizations supplied to half of the cores induce a net transfer of information signals in only a predetermined one of the signal windings. The particular branch winding selected depends upon the sequence in which clock signals are applied to the balanced magnetic cores.

Figure 1A:
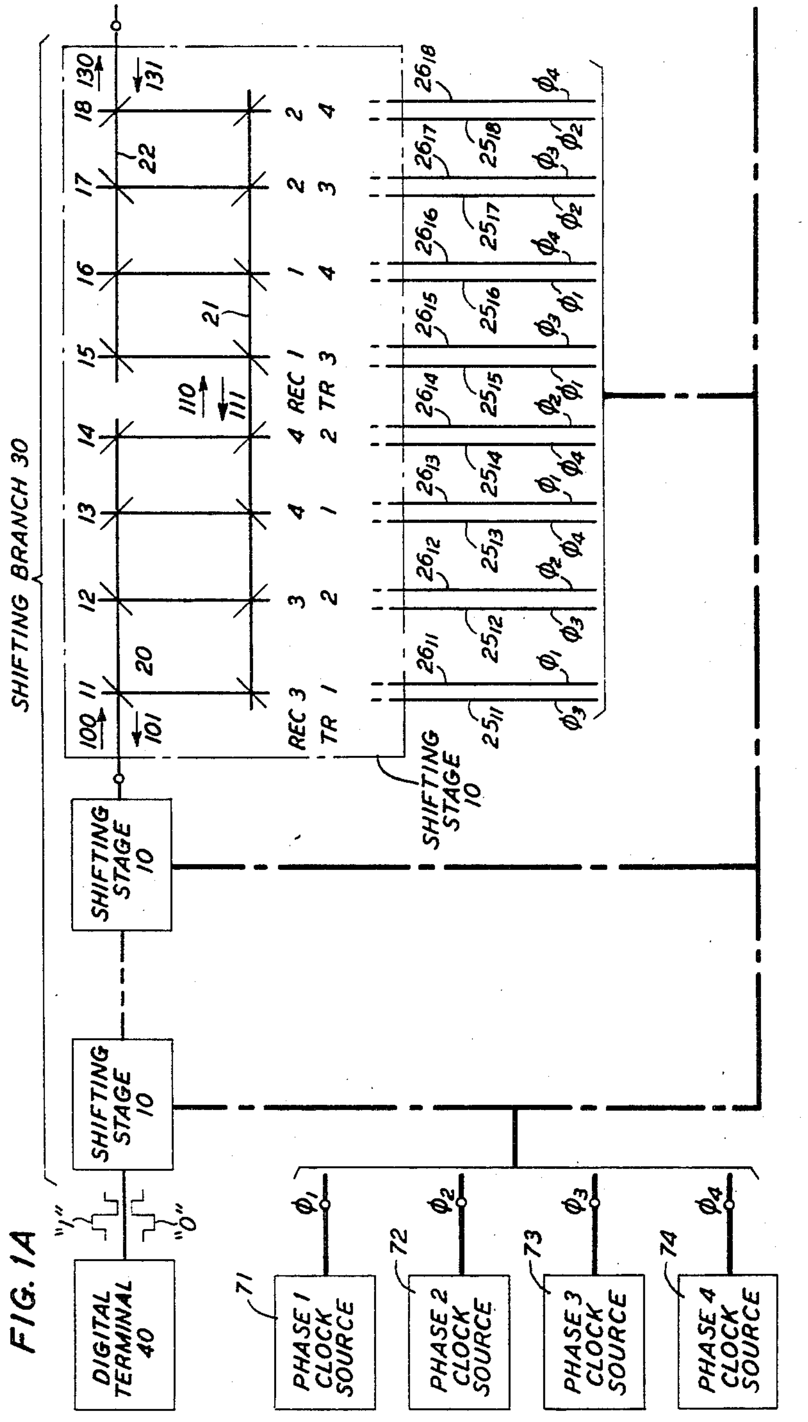

This invention relates to magnetic core circuits and, more specifically, to a ferromagnetic core arrangement which functions as a branching shift register.

Electronic and magnetic circuit combinations which register a plurality of information digits at discrete storage locations and advance the stored information at periodic time intervals are well known. These circuits typically include a plurality of shifting stages which receive binary input signals and supply corresponding digits to their output terminals delayed in time from the input quantities. One extensively employed shift register embodiment includes a plurality of set-reset flip-flop circuits in one-to-one correspondence with the maximum number of information digits to be stored in the register at any single time. A clock source is connected to either the set or reset terminal of each flip-flop, and the output of each register stage is connected by a delaying element to the remaining input terminal of the next succeeding stage, with an input information source being connected to the second input terminal of the first stage flip-flop. Information is then registered and propagated down the chain of shift register stages by alternate energizations supplied by the information source and the clock source.

In the above and other prior art registers, information is characteristically translated through a single set of cascaded shifting stages, either in a unidirectional or bidirectional mode of operation. However, a plurality of circuit applications, e.g., digital multiplexing systems, require the selective transfer of information among a plurality of signal channels, or branches.

It is therefore an object of the present invention to provide a branching magnetic core shift register.

More specifically, an object of the present invention is the provision of a shift register embodiment which selectively translates digital information through a plurality of signal shifting register branches.

Another object of the present invention is the provision of a highly reliable magnetic core branching shift register which may advantageously be inexpensively and easily fabricated.

These and other objects of the present invention are realized in a specific, illustrative, branching shift register wherein digital information bilaterally propagates through selected register branches. The arrangement includes a plurality of balanced multiapertured magnetic core stages, with a digital bit translating through an associated shifting stage responsive to four impressed clock phase signals.

A linked set of $2^n$ cores is included in the shifting stage associated with each register branching point to selectively route information among a total of $2^n-1$ incoming and outgoing branches via $2^n-1$ mutually orthogonal coupling windings. The particular information propagating path is dependent upon the specific manner in which the clock signals are supplied to the cores.

It is thus a feature of the present invention that a magnetic core shift register include a plurality of information shifting branches and a set of cores at each register branch point for selectively routing digital information therebetween.

It is another feature of the present invention that a branching shift register include $2^n-1$ digital information translating channels, $2^n$ square loop magnetic storage elements, $2^n-1$ signal windings coupled in a mutually orthogonal relationhsip to the cores and selectively connected to the information channels, and information routing clock circuitry for selectively switching a first set of $2^{n-1}$ of the cores and, thereafter, switching the remaining $2^{n-1}$ of the cores.

Figure 1B:
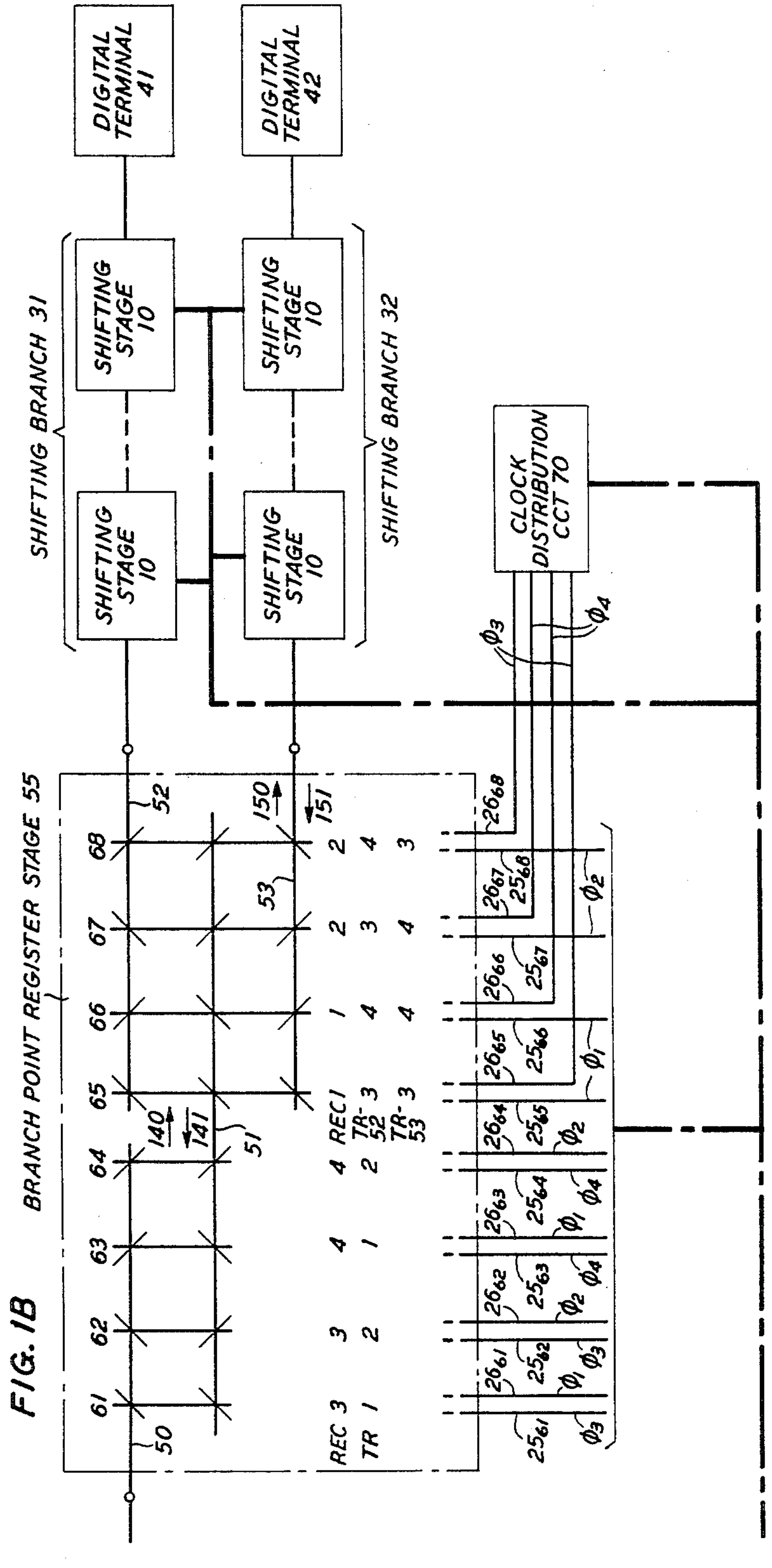
Figure 2A:
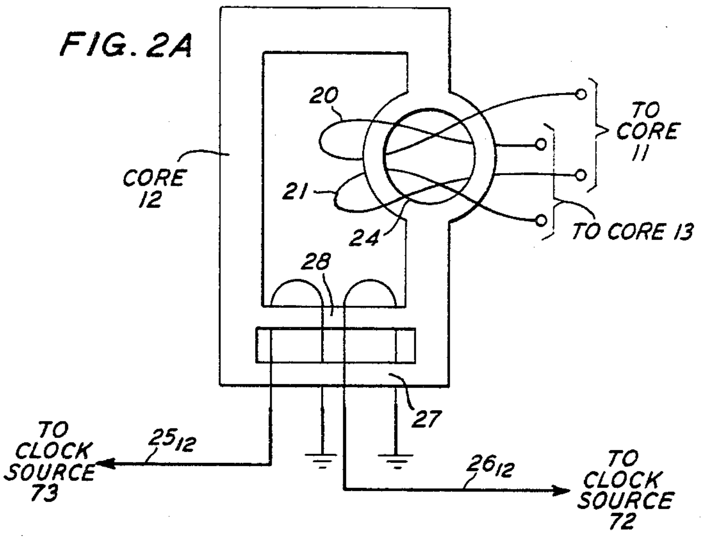
Figure 2B:
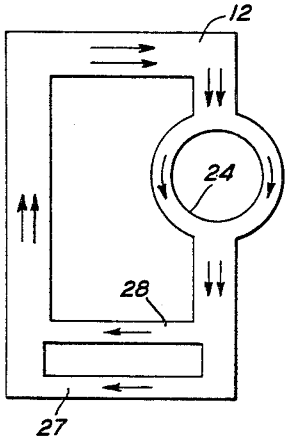
Figure 2C:
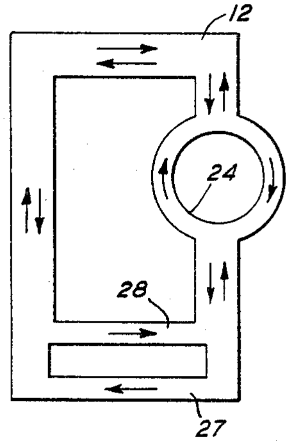
Figure 2D:
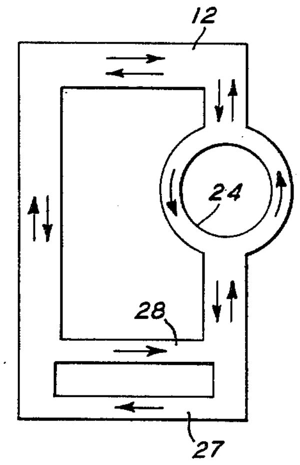
Figure 3:
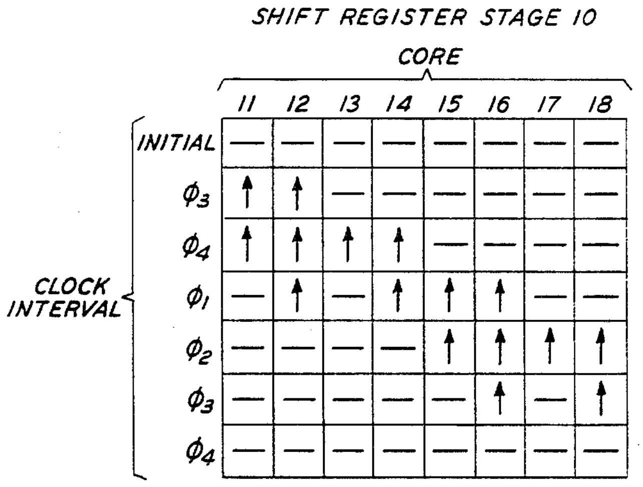
Figure 4:
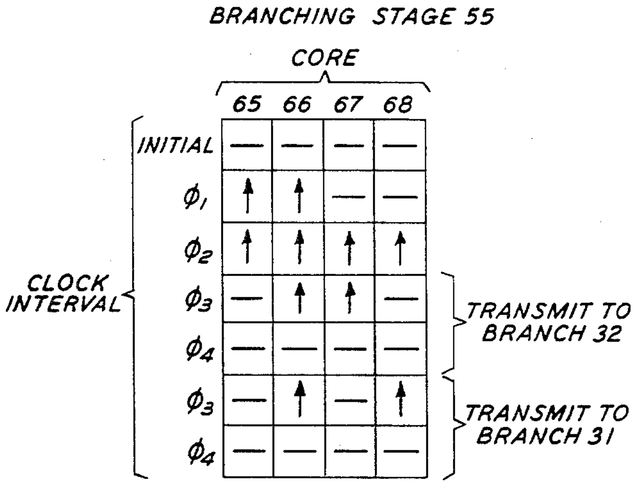

A complete understanding of the present invention and of the above and other features, advantages and variations thereof may be gained from a consideration of the following detailed description of an illustrative embodiment thereof presented hereinbelow in conjunction with the accompanying drawing, in which:

FIGS. 1A and 1B respectively comprise the left and right portions of a diagram depicting a specific, illustrative magnetic core branching shift register which embodies the principles of the present invention;

FIG. 2A is a diagram depicting in detail a selected magnetic core 12 included in FIG. 1A;

FIGS. 2B through 2D respectively illustrate three distinct magnetic states which obtain in the core 12 shown in FIG. 2A;

FIG. 3 illustrates a plurality of magnetic states characterizing a first selected set of cores included in FIG. 1A; and FIG. 4 illustrates a plurality of magnetic states characterizing a second selected set of cores included in FIG. 1B.

Referring now to FIGS. 1A and 1B, hereinafter referred to as composite FIG. 1, there is shown a specific, illustrative, magnetic core shift register wherein digital information selectively propagates through three shifting branches 30 through 32. Each of the branches 30 through 32 includes a plurality of shifting stages 10, with the register branches being respectively connected at their extremities to an associated plurality of digital information terminals 40 through 42, and to a common magnetic core branching stage 55. The digital terminals 40 through 42 are adapted to selectively supply and receive digital information, wherein binary "1" and "0" signals, shown in FIG. 1 alongside the terminal 40, are respectively manifested by bipolar currents which first flow towards or away from the receiving structure.

Four clock sources 71 through 74 are employed to respectively supply a phase 1 through a phase 4 clock voltage pulse to the shifting and branch point register stages 10 and 55. The clock signals are cyclically generated in the sequential order phase 1 through phase 4 ($\Phi_1$ through $\Phi_4$). Finally a clock signal distribution circuit 70, of a type and nature more fully described hereinafter, is utilized to selectively connect the phase 3 and phase 4 clock sources 73 and 74 to a plurality of transmitting windings $26_{65}$ through $26_{68}$. These windings 26 are coupled in accordance with the subscripts associated therewith to a set of cores 65 through 68 in a manner described hereinbelow.

A representative shifting stage 10, included in the shifting branch 30, is illustrated in detail in FIG. 1 and comprises four information receiving cores 11 through 14 and four data transmitting cores 15 through 18. It is noted at this point, that functional designations such as "receiving," "transmitting," and the like correspond to an information translation from left to right in FIG. 1. This digital propagation direction is presumed to obtain unless a contrary direction is particularly stated.

The stage 10 of the branch 30 further comprises incoming and outgoing coupling windings 20 and 22 which are respectively inductively linked in the relative polarity relationships shown in FIG. 1 to the cores 11 through 14 and 15 through 18, and also an intra-stage short-circuited coupling loop 21 which is coupled to each of the cores 11 through 18. In addition, a different receiving winding 25 and transmitting winding 26, of a nature disclosed hereinafter, are coupled to each of the cores 11 through 18 and connected to the particular clock source 71 through 74 indicated by the phase ($\Phi$) designation shown alongside the winding in FIG. 1. More specifically, the receiving winding 25 coupled to a core is connected to the clock phase given by the receiving (Rec.) numeral shown associated therewith in FIG. 1, and the transmitting winding 26 coupled thereto is connected to the clock phase given by the transmitting (Tr.) numeral also illustrated therein.

The core 12, which is typical of each of the ferromagnetic cores included in the FIG. 1 branching shift register, is shown in detail in FIG. 2A and comprises a balanced multiapertured structure of a type described in detail in a pending application by J. N. Brown, Jr., and E. E. Nyewhall, Ser. No. 241,442, filed Nov. 30, 1962. Briefly, the core 12 includes an aperture 24, a driving leg 27 and a shunt leg 28. The coupling windings 20 and 21 associated with the core 12 are linked in a figure "8" configuration to the ferromagnetic material surrounding the aperture 24. Moreover, since the windings 20 and 21 are shown in FIG. 1 as coupled in opposite polarities to the core 12, these windings are inductively linked in an opposite relative orientation to the material on either side of the aperture 24. Finally, the receiving winding $\mathbf{25}_{12}$ is coupled in opposing polarities to the driving and shunt legs 27 and 28 whereas the transmitting winding $\mathbf{26}_{12}$ is linked in a like sense to these core legs. One terminal of each of the windings $\mathbf{25}_{12}$ and $\mathbf{26}_{12}$ is shown grounded in FIG. 2, while the other winding terminals are connected to the clock sources 73 and 72, which correspond to the $\Phi_3$ and $\Phi_4$ phase symbols, and also correspond to the receive and transmit numerals "3" and "2" shown associated therewith in FIG. 1.

The core 12 initially resides in a maximum remanent flux condition which is shown in FIG. 2B. When the winding $\mathbf{25}_{12}$ is energized during a receiving cycle ($\Phi_3$), a new flux perturbation is established around the aperture 24 in a clockwise or counter-clockwise direction respectively shown in FIGS. 2C and 2D, when a binary "1" or "0" signal current, respectively, coincidentally flows in the associated incoming winding 20 (not shown in FIGS. 2C and 2D). When the transmitting winding $\mathbf{26}_{12}$ is later activated during a transmitting cycle ($\Phi_2$), a signal is induced in the intrastage coupling winding 21 in a polarity which depends upon the residual flux condition around the aperture 24. It is noted that no flux change can be effected around the core aperture 24 if neither the receiving nor transmitting winding $\mathbf{25}_{12}$ or $\mathbf{26}_{12}$ is enabled and, therefore, no signals are induced by the core 12 in either of the windings 20 or 21 coupling the aperture 24 under these conditions.

For purposes of clearly illustrating the instant branching shift register, the cores 11 through 18, along with all other ferromagnetic core elements, are represented by standard mirror symbology in FIG. 1. Accordingly, the clockwise and counter-clockwise flux perturbations around the core apertures 24 are transformed into "up" and "down" flux states in FIG. 1, while the initial remanent core condition is hereinafter described as a neutral signal flux state. A detailed description of the mirror symbology employed herein is described by M. Karnaugh in the Proceedings of the I.R.E., May 1955, at page 570. Moreover, since the receiving and transmitting windings 25 and 26 are not coupled to the signal apertures included in the FIG. 1 cores, these windings are not shown connected thereto in this illustration.

At this point, a typical sequence of circuit operation characterizing the shift register stages 10 will be described. More particularly, assume that the cores 11 through 18 of the specifically illustrated stage 10 included in the register branch 30 initially reside in their neutral, initial magnetic condition indicated by the horizontal dash marks in the upper row in FIG. 3. Further, let the digital terminal 40 supply a binary "1" signal to the stage 10 incoming winding 20 via the remaining branch 30 shifting stages 10, which signal comprises a positive current flowing in the direction of a vector 100 shown in FIG. 1 during clock phase $\Phi_3$, and a negative current flowing in the direction of a vector 101 during the next following clock phase, viz. $\Phi_4$.

During clock phase $\Phi_3$, the clock source 73 energizes the receiving windings $\mathbf{25}_{11}$ and $\mathbf{25}_{12}$ coupled to the cores 11 and 12. Since the cores 11 and 12 are enabled during the $\Phi_3$ clock interval, the positive binary "1" signal current switches these cores to an upward storage state as indicated in the second row in FIG. 3. However, as the cores 13 and 14 are not enabled during this time interval, the energized incoming winding 20 has no effect thereon. In addition, the flux switched in the cores 11 and 12 induces equal and opposite voltage signals in the intra-stage coupling loop 21 responsive to the opposing coupling polarities with which this winding couples these cores. Hence, the winding 21 is not energized during the $\Phi_3$ operative cycle.

The $\Phi_4$ clock voltage signal is next generated and supplied by the source 74 to the core receiving windings $\mathbf{25}_{13}$ and $\mathbf{25}_{14}$ coincident in time with the negative portion of the incoming binary "1" signal. Accordingly, the cores 13 and 14 are also set to an upward magnetic condition, as seen in the third row in FIG. 3 associated with the clock interval $\Phi_4$. In correspondence with the circuit operation described above for the previous $\Phi_3$ interval, the cores 11 and 12 are unaffected by the negative incoming signal since the receiving windings $\mathbf{25}_{11}$ and $\mathbf{25}_{12}$ associated therewith are not enabled at this time. Further, the flux switched in the cores 13 and 14 induces cancelling signals in the intrastage coupling winding 21.

Responsive to the next clock pulse supplied by the $\Phi_1$ source 71 to the transmitting windings $\mathbf{26}_{11}$ and $\mathbf{26}_{13}$ and to the receiving windings $\mathbf{25}_{15}$ and $\mathbf{25}_{16}$, the cores 11 and 13 are each driven to their initial, neutral signal condition. Accordingly, each of these cores induces a current in the intra-stage coupling loop 21, in the direction of a vector 110 shown in FIG. 1, which is operative to set the enabled receiving cores 15 and 16 to an upward storage state. It is observed that the incoming and outgoing stage 10 windings 20 and 22 are not activated during the $\Phi_1$ interval, since the switched cores 11 and 13, and 15 and 16 are respectively linked thereto in opposite polarities, and hence induce opposing potentials therein. Thus, during the intra-stage signal transmission process, the specific shifting stage 10 under consideration is isolated from contiguous stages. The storage states for the cores 11 through 18 following the $\Phi_1$ clock phase are shown in the corresponding row in FIG. 3.

During the $\Phi_2$ clock interval, a mode of signal propagation paralleling that described above for $\Phi_1$ obtains, with the cores 12 and 14 being neutralized and the receiving cores 17 and 18 being set to an upward direction by a negative current which flows in the coupling loop 21 in a direction given by a vector 111 shown in FIG. 1. It is noted that the positive and negative currents flowing in the intra-stage winding 21 during the $\Phi_1$ and $\Phi_2$ clock intervals correspond to the respective portions of the original incoming binary "1" signal.

When the clock source 73 supplies the next cyclically recurring $\Phi_3$ signal, the cores 15 and 17 are neutralized responsive to the enabled transmitting windings $26_{15}$ and $26_{17}$ respectively coupled thereto. The flux switched in these cores induces additive positive signals in the stage 10 outgoing winding 22 in the direction given by a vector 130, and further induces equal and opposite cancelling voltages in the intra-stage winding 21 hence avoiding any backward signal propagation. Similarly, during the next clock phase, viz., $\Phi_4$, cores 16 and 18 are neutralized thereby inducing negative signals in the outgoing winding 22 in the direction of a vector 131, while not energizing the intra-stage winding 21.

Hence, it is seen that the incoming binary "1" signal received by the shifting stage 10 during the clock periods $\Phi_3$ and $\Phi_4$ is supplied to the next following shift register stage during the next recurring $\Phi_3$ and $\Phi_4$ clock phases. A similar sequence of circuit operations occurs for received binary "0" digits, with each of the vertically upward vectors shown in FIG. 3 being replaced by a downward orientated arrow.

As noted hereinabove, the branch point register stage 55 is employed to selectively control the information flow among the shifting branches 30 through 33. The stage 55 includes an incoming winding 50, an intra-stage coupling winding 51, and a first set of cores 61 through 64 which function in a manner identical to the corresponding elements included in the shifting stages 10, viz., the windings 20 and 21 and the cores 11 through 14. More specifically, a binary digit is inserted into the cores 61 through 64 by an activated incoming winding 50 during clock phases $\Phi_3$ and $\Phi_4$, and a like digital signal is induced in the intra-stage winding 51 during the succeeding $\Phi_1$ and $\Phi_2$ clock phases.

In generalized terms, the intra-stage coupling winding 51 is further inductively linked to a second set of $2^n$ cores (65 through 68 in FIG. 1), wherein $2^n-1$ shifting branches (three in FIG. 1) converge on the branching stage 55. A plurality of $2^n-1$ mutually orthogonal windings, including the intra-stage winding 51, are selectively coupled to the $2^n$ cores, with each of these windings being associated with a different register branch. The windings are orthogonal in the sense that receiving and transmitting clock energizations supplied to any half ($2^{n-1}$) of the $2^n$ cores will induce a net signal in only a selected one of the $2^n-1$ windings, and induce cancelling signals in the remainder of such windings. A procedure for defining the polarity in which the $2^n-1$ orthogonal windings are linked to the $2^n$ cores is given hereinafter.

With regard to the arrangement shown in FIG. 1, the stage 55 second core set includes $2^n=4$ ($n=2$) cores 65 through 68, corresponding to the $2^n-1=3$ shift register branches 30 through 32. Coupled to the cores 65 through 68 are $2^n-1=3$ mutually orthogonal windings including the intra-stage loop 51 associated with the register branch 30, and two outgoing windings 52 and 53 respectively connected to the shifting branches 31 and 32.

The clock distribution circuit 70 is employed to selectively connect the transmitting windings 26 coupled to the cores 65 through 68 to the $\Phi_3$ and $\Phi_4$ clock sources 73 and 74 in a manner determined by the desired signal propagation path. For purposes of concreteness, assume that information is to be transmited from the digital terminal 40 to the terminal 42. Accordingly, the core transmitting windings $26_{65}$ and $26_{68}$, and the windings $26_{66}$ and $26_{67}$ are respectively connected by the distribution circuit 70 to the clock sources 73 and 74, as indicated by the transmit-to-winding 53 (Tr-53) numerals "3," "4," "4" and "3" shown in FIG. 1. It is noted that the clock distribution circuit 70 may comprise any matrix switching array, including either mechanical or electronic crosspoint connectors, to selectively join the clock sources 73 and 74 with the core transmitting windings $26_{65}$ through $26_{68}$.

Assume now that the digital terminal 40 in conjunction with the shifting branch 30 supplies a binary "1" signal, comprising sequential positive and negative portions coincident in time with the $\Phi_3$ and $\Phi_4$ clock phases, to the branching point stage 55. During the $\Phi_3$ and $\Phi_4$ clock energizations supplied by the sources 73 and 74, the cores 61 and 62 and then 63 and 64 are set to an upward magnetic state by a mode of circuit functioning described in detail hereinabove with respect to the stage 10 cores 11 through 14.

When the clock source 71 next supplies a clock signal to the core 61 and 63 transmitting windings $26_{61}$ and $26_{63}$, a positive signal current is induced in the intra-stage winding 51 in a direction given by a vector 140 shown in FIG. 1. Since the receiving windings $25_{65}$ and $25_{66}$ are energized during this clock interval, the cores 65 and 66 are switched by the energized winding 51 from their initial, neutral signal state shown in the upper row in FIG. 4 to an upward storage direction, as indicated in the second ($\Phi_1$) row in FIG. 4. However, as the stage 55 outgoing windings 52 and 53 are coupled in opposing polarities to the cores 65 and 66, the above-noted flux changes transpiring therein induce equal and opposite cancelling signals in these windings. Hence, no net signal is detected by either of the shift register branches 31 or 32 at this time. Similarly, during the next occurring $\Phi_2$ clock phase, the cores 67 and 68 are set upward by a negative current, in the direction of a vector 141, which flows in the intra-stage link 51 during this interval. Moreover, no net signals are induced in either of the outgoing windings 52 and 53 by the flux changes effected in the cores 67 and 68.

Responsive to the $\Phi_3$ clock voltage pulse supplied by the source 73 to the transmitting windings $26_{65}$ and $26_{68}$ via the clock distribution circuit 70, the cores 65 and 68 are driven to their neutral signal condition, as indicated in the fourth row of FIG. 4 associated with the $\Phi_3$ clock phase. Since the outgoing winding 53 is coupled in a like polarity to the cores 65 and 68, these cores are operative to induce a net positive signal therein in the direction given by a vector 150. Accordingly, this positive current is supplied by the enabled outgoing winding 53 to the shifting branch 32. However, as the enabled cores 65 and 68 are coupled in an opposite polarity to each of the windings 51 and 52, no net energization is induced therein and, therefore, no signals are directed at this time towards either of the shifting branches 30 or 31. Similarly, during the $\Phi_4$ clock interval, the cores 66 and 67 are driven to a neutral signal condition thereby inducing a negative current, in the direction of a vector 151 shown in FIG. 1, in the outgoing stage 55 winding 53. Moreover, since the windings 51 and 52 are each coupled in opposite polarities to the cores 66 and 67, these windings are not activated at this time.

Hence, the branch point register stage 55 has been shown by the above to accept a binary digit supplied thereto by the register branch 30 during the $\Phi_3$ and $\Phi_4$ clock intervals, and to supply a like digit to the shifting branch 32 via the outgoing winding 53 included therein during the next following $\Phi_3$ and $\Phi_4$ periods. In a similar manner, when the transmitting windings $26_{65}$ through $26_{68}$ are respectively connected to the clock sources 73 and 74 in accordance with the transmit-to-winding 52 (Tr–52) numerals "3," "4," "3," and "4" shown in FIG. 1, the information supplied by the branch 30 is supplied by the stage 55 to the shifting branch 31 after a cyclic delay of four clock phases. The storage states which obtain in the transmit-to-branch 31 mode of operation are depicted in the two bottom rows in FIG. 4.

It is noted at this point, that the FIG. 1 shift register arrangement may advantageously be operated to propagate information in a right-to-left direction, in place of the left-to-right translation path considered above, by simply constraining the sources 71 through 74 to supply the clock phase energizations in the reverse order, viz., $\Phi_4$ through $\Phi_1$. The details of such a mode of operation follow from a circuit analysis identically paralleling that given above for left-to-right signal translation.

It remains now to describe a procedure for determining the polarity with which each of the generalized plurality of $2^n-1$ mutually orthogonal coupling windings are linked to the $2^n$ second set of cores included in a branching register stage 55. The following describes a recursive method for effecting this polarity determination, wherein binary "1" and "0" character respectively represent the two alternative senses in which a winding may be coupled to a magnetic core element.

PROCEDURE

Begin with the $n=1$ case, where there is only one winding of interest, viz., 10, which is coupled to the first of $2^1=2$ cores in the "1" sense, and coupled to the other core in a "0" polarity. Construct the winding set for $n=2$ as follows:

(1) Write the set for $n=1$ followed by the set for $n=1$. We then have 1010.

(2) Below the results of step 1 write the set for $n=1$ followed by the set for $n=1$ complemented. We then have: 1010, 1001.

(3) Following the product of step 2, add a set consisting of first half "1's" and second half "0's." We then have: 1010, 1001, 1100.

Each of the above-listed three digital words defines one winding for $n=2$. With reference to the branching register stage 55 shown in FIG. 1, the three rows respectively correspond to the mutually orthogonal windings 52, 53, and 51.

(4) Repeat for all larger $n$ by employing the previous set in each case.

For example, for $n=3$,

Step 1:
10101010
10011001
11001100
Step 2:
10100101
10010110
11000011
Step 3:
11110000 with these seven digital words defining the pattern in which the $2^3-1=7$ windings link the $2^3=8$ cores.

Summarizing, an illustrative shift register made in accordance with the principles of the present invention employs a plurality of multiapertured cores to bilaterally propagate digtial information through selected register branches. The arrangement includes a plurality of balanced magnetic core stages, with a digital bit translating through an associated shifting stage responsive to four impressed clock phase signals.

A linked set of $2^n$ cores is included in the shifting stage associated with each register branching point to selectively route information among a total of $2^n-1$ incoming and outgoing branches via $2^n-1$ mutually orthogonal coupling windings. The particular information propagating path is dependent upon the specific manner in which the clock signals are supplied to the cores.

It is to be understood that the above-described arrangements are only illustrative of the application of the principles of the present invention. Numerous other arrangements may be devised by those skilled in the art without departing from the spirit and scope of this invention. For example, the clock sources 71 through 74 may advantageously comprise current, and not voltage supplying embodiments. In such an organization, all receiving and transmitting windings 25 and 26 associated with a like clock source would be serially interconnected, and further connected to that source.

What is claimed is:

1. In combination, $2^n$ square loop magnetic storage elements, where $n$ is any positive integer greater than 1, $2^n-1$ signal windings coupled in a mutually magnetically orthogonal relationship to said elements, and first clock means for sequentially switching a first selected set of $2^{n-1}$ of said elements and then switching the remaining $2^{n-1}$ of said elements.

2. A combination as in claim 1 further comprising second clock means for sequentially switching a second set of $2^{n-1}$ of said elements and then switching the remaining $2^{n-1}$ of said cores.

3. A combination as in claim 2 further comprising $2^n-1$ digital information translating channels each connected to a different one of said mutually orthogonal signal windings.

4. A combination as in claim 3 wherein said first and second clock means comprise a plurality of clock sources for sequentially supplying cyclic clock pulses, and a clock distribution circuit connected to said clock sources.

5. A combination as in claim 4 wherein each of said information translating channels comprises a plurality of cascaded shift register stages.

6. A combination as in claim 5 wherein each of said shift register stages comprises a first set of four elements and a second set of four elements, an intra-stage coupling winding linked to each element included in said first and said second four element sets, an incoming winding coupled to each element included in said first four element set, and an outgoing winding coupled to each element included in said second four element set, said incoming and outgoing windings being respectively coupled to the four element set associated therewith in an orthogonal relationship with said intra-stage coupling winding.

7. A combination as in claim 6 further comprising a plurality of digital terminals each connected to a different one of said information translating channels.

8. A combination as in claim 1 wherein said $2^n-1$ orthogonal windings are coupled to said $2^n$ elements in accordance with a binary matrix $[B_n]$, where $$[B_n]=\begin{bmatrix}[B_{n-1}] & [B_{n-1}] \\ [B_{n-1}] & [B^c_{n-1}] \\ [1\ldots1] & [0\ldots0]\end{bmatrix}$$

wherein $[B_{n-1}]=[10]$ for $n=2$, and wherein $[B^c_{n-1}]$ comprises $[B_{n-1}]$ with all the binary digits complemented.

9. In combination, a plurality of square loop magnetic cores, a plurality of signal windings coupled in a mutually magnetically orthogonal relationship to said cores, and first clock means coupled to said cores for sequentially switching a first set of said cores and then switching the remainder of said cores.

10. A combination as in claim 9 further comprising second clock means coupled to said cores for sequentially switching a second set of said cores, and then switching the remainder of said cores.

11. A combination as in claim 10 further comprising a plurality of digital information translating channels each connected to a different one of said mutually orthogonal signal windings.

12. A combination as in claim 11 wherein said first and second clock means comprise a plurality of clock sources for sequentially supplying cyclic clock pulses, and a clock distribution circuit connected to said clock sources.

13. A combination as in claim 12 wherein each of said information translating channels comprises a plurality of cascaded shift register stages.

14. A combination as in claim 13 wherein each of said shift register stages comprises a first set of four cores and a second set of four cores, an intra-stage coupling winding linked to each core included in said first and second core sets, an incoming winding coupled to each core included in said first set of four cores, and an outgoing winding coupled to each core included in said second set of four cores, said incoming and outgoing windings being respectively coupled to the four core set associated therewith in an orthogonal relationship with said intra-stage coupling winding.

15. A combination as in claim 14 further comprising a plurality of digital terminals each connected to a different one of said information translating channels.

16. A combination as in claim 9 wherein said signal windings are coupled to said cores in accordance with a binary matrix $[B_n]$, where $$[B_n]=\begin{bmatrix}[B_{n-1}] & [B_{n-1}] \\ [B_{n-1}] & [B^c_{n-1}] \\ [1\ldots1] & [0\ldots0]\end{bmatrix}$$

wherein $[B_{n-1}]=[10]$ for $n=2$, and wherein $[B^c_{n-1}]$ comprises $[B_{n-1}]$ with each of the elements therein reversed to their alternate binary character.

17. A combination as in claim 16 further comprising digital terminal means connected to each of said orthogonal windings.

18. In combination, a plurality of information channels, an information shifting stage connected to each of said channels, said shifting stage comprising a plurality of balanced magnetic multiapertured cores and a plurality of magnetically mutually orthogonal windings selectively coupled thereto and respectively connected to said information channels.

19. In combination, a plurality of balanced magnetic cores, winding means coupled to each of said cores to enable ferromagnetic switching therein, a plurality of magnetically mutually orthogonal windings coupled to said cores, first clock means connected to said winding means for selectively enabling a first set of said cores, and second clock means connected to said winding means for enabling the remainder of said cores.

References Cited

UNITED STATES PATENTS 3,004,246 10/1961 Harper ............ 340—174

STANLEY M. URYNOWICZ, Jr., Primary Examiner